United States Patent
Mehrvar et al.

(10) Patent No.: US 7,260,102 B2
(45) Date of Patent: Aug. 21, 2007

(54) TRAFFIC SWITCHING USING MULTI-DIMENSIONAL PACKET CLASSIFICATION

(75) Inventors: Hamid R. Mehrvar, Nepean (CA); Roland A. Smith, Nepean (CA); Xiaoming Fan, Kanata (CA); Mark Wight, Ottawa (CA)

(73) Assignee: Nortel Networks Limited, St. Laurent, QC (CA)

( * ) Notice: Subject to any disclaimer, the term of this patent is extended or adjusted under 35 U.S.C. 154(b) by 923 days.

(21) Appl. No.: 10/079,559

(22) Filed: Feb. 22, 2002

(65) Prior Publication Data

US 2003/0161303 A1 Aug. 28, 2003

(51) Int. Cl.
*H04L 12/28* (2006.01)
*G06F 15/173* (2006.01)

(52) U.S. Cl. .................. 370/412; 370/389; 709/239

(58) Field of Classification Search ............... 370/389, 370/390, 392, 401, 412, 428, 432, 400
See application file for complete search history.

(56) References Cited

U.S. PATENT DOCUMENTS

| | | | | |
|---|---|---|---|---|
| 4,630,260 A | * | 12/1986 | Toy et al. ................. | 370/355 |
| 5,777,986 A | * | 7/1998 | Grossman ................. | 370/235 |
| 6,452,915 B1 | * | 9/2002 | Jorgensen ................. | 370/338 |
| 6,594,268 B1 | * | 7/2003 | Aukia et al. ............... | 370/400 |
| 6,633,544 B1 | * | 10/2003 | Rexford et al. ............ | 370/238 |
| 6,633,835 B1 | * | 10/2003 | Moran et al. .............. | 702/190 |
| 6,714,517 B1 | * | 3/2004 | Fawaz et al. .............. | 370/236 |
| 2003/0063562 A1 | * | 4/2003 | Sarkinen et al. ........... | 370/230 |
| 2003/0081624 A1 | * | 5/2003 | Aggarwal et al. .......... | 370/412 |
| 2003/0088671 A1 | * | 5/2003 | Klinker et al. ............. | 709/225 |
| 2004/0081091 A1 | * | 4/2004 | Widmer et al. ............ | 370/230 |

* cited by examiner

*Primary Examiner*—Wing Chan
*Assistant Examiner*—Venkatesh Haliyur
(74) *Attorney, Agent, or Firm*—Kent Daniels; Ogilvy Renault LLP

(57) ABSTRACT

A method and system for conveying an arbitrary mixture of high and low latency traffic streams across a common switch fabric implements a multi-dimensional traffic classification scheme, in which multiple orthogonal traffic classification methods are successively implemented for each traffic stream traversing the system. At least two diverse paths are mapped through the switch fabric, each path being optimized to satisfy respective different latency requirements. A latency classifier is adapted to route each traffic stream to a selected path optimized to satisfy latency requirements most closely matching a respective latency requirement of the traffic stream. A prioritization classifier independently prioritizes traffic streams in each path. A fairness classifier at an egress of each path can be used to enforce fairness between responsive and non-responsive traffic streams in each path. This arrangement enables traffic streams having similar latency requirements to traverse the system through a path optimized for those latency requirements.

24 Claims, 5 Drawing Sheets

TRAFFIC SWITCHING USING MULTI-DIMENSIONAL PACKET CLASSIFICATION

CROSS-REFERENCE TO RELATED APPLICATIONS

This is the first application filed for the present invention.

MICROFICHE APPENDIX

Not Applicable.

TECHNICAL FIELD

The present invention relates to data traffic switching systems, and, in particular, to traffic switching using a multi-dimensional packet classification system.

BACKGROUND OF THE INVENTION

In broadband packet network nodes (e.g., Internet protocol—IP routers), the majority of packet processing normally occurs as each packet enters the node (referred to as ingress processing). Such ingress processing typically includes forwarding table look-up to selecting an appropriate output interface, and loading each packet into a queue for transport through a switch fabric to the selected output interface. A minimal amount of egress processing is typically performed (within the output interface) as each packet leaves the node.

As is known in the art, traffic flows with differing latency requirements can be handled using a prioritization scheme as part of the ingress processing. The purpose of any prioritization scheme is to minimize delays experienced by high priority traffic being transported through the node. In general, prioritization schemes may be broadly classified as either preemptive, or non-preemptive. In a preemptive scheme, a high priority packet can preempt a lower priority packet already loaded into the queue for transport through the switch core. If transport of that low priority packet has already begun, then it is terminated so that the higher priority packet can be sent without delay. In contrast, in a non-preemptive scheme, if transport of a lower priority packet through the switch core has already begun, then it is allowed to continue uninterrupted. However, the higher priority packet must then be sent before the next lower priority packet is loaded into the queue.

Both of these schemes have disadvantages. In particular, the pre-emptive scheme requires comparatively complex input processing and leads to an inefficient utilization of network resources. For example, preemption of a partially transmitted (lower priority) packet means that the "sent" portion of the packet is discarded. This results in lowered efficiency, as network resources have been utilized to transport a partial packet that is subsequently discarded. Furthermore, in order to permit re-sending of the packet, it must be retained in memory (in the input interface) until it has been successfully transported through the switch fabric to the output interface. In addition, even when lower priority traffic is preempted, the additional processing required to implement this scheme imposes its own delays on the high priority traffic. As may be appreciated, the non-preemptive scheme avoids many of these difficulties, but at the expense of increasing latency of the high priority traffic, which is delayed until transmission of an already partially sent packet has completed.

In practice, conventional prioritization schemes can result in the high priority traffic incurring a delay well in excess of 100 μSec at the input interface. For most Internet Protocol (IP) traffic, such delays are acceptable. However, many traffic types have very stringent latency requirements. For example, under the Synchronous Optical Network (SONET) protocol, frame latency within a node (not just within the input interface) is restricted to a few tens of micro-seconds. Voice over IP (VoIP) and multimedia traffic are also latency-sensitive. While it would be desirable to transport a wide variety of traffic types across common network infrastructure, current prioritization schemes cannot reliably satisfy the stringent latency requirements of SONET traffic.

Accordingly, a system that enables traffic flows with differing latency requirements to be efficiently transported across a common network infrastructure remains highly desirable.

SUMMARY OF THE INVENTION

An object of the present invention is to provide a method and system for efficiently transporting traffic flows with differing latency requirements across a common network infrastructure.

Accordingly, an aspect of present invention provides a system for conveying an arbitrary mixture of high and low latency traffic streams across a common switch fabric. At least two diverse paths are mapped through the switch fabric, each path being optimized to satisfy respective different latency requirements. A latency classifier is adapted to route each traffic stream to a selected path optimized to satisfy latency requirements most closely matching a respective latency requirement of the traffic stream.

In preferred embodiments of the invention, traffic streams within each path are processed independently. Each path may be mapped through respective different physical infrastructure of the switch fabric. Alternatively, two or more paths are mapped through a common physical infrastructure, provided that it is capable of supporting a latency requirement of the path optimized to satisfy the most demanding latency requirements.

In some embodiments, each path include a respective input queue adapted to buffer data of each traffic streams being conveyed through the path. Each path may further includes a respective prioritization classifier designed to control a priority of each traffic stream being conveyed through the path.

In some embodiments, the input queue includes at least two parallel buffers, each of which is designed to store data of at least one traffic stream being conveyed through the path. A scheduler is used to control transmission of data from each buffer through the path. In these embodiments, the prioritization classifier can be designed to route each traffic stream to a selected one of the buffers based on a content of a predetermined field of the respective overhead of each traffic stream. In cases where each traffic stream being conveyed through the path contains Synchronous Optical Network (SONET) traffic (or, more generally, any mission-critical traffic), the prioritization classifier can be designed to route each traffic stream to a selected one of the buffers so that, for example, K-byte messaging is given priority over other traffic in the path. In cases where each traffic stream being conveyed through the path is an Internet Protocol (IP) traffic stream, the prioritization classifier can be designed to route each traffic stream to a selected one of the buffers based on a content of a Differentiated Services Code Point (DSCP) field of each packet overhead.

A fairness classifier can be located at an egress of a path. This fairness classifier is designed to separate responsive and non-responsive traffic streams received through the respective path. In some embodiments, the fairness classifier is designed to route each of the responsive and non-responsive traffic streams to a respective buffer.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides a system that enables traffic streams with differing latency requirements to be efficiently transported across a common network infrastructure. For convenience of description, the present invention is described herein by way of examples of traffic streams being transported through a network node. However, those of ordinary skill in the art will appreciate that the present invention is by no means limited to a single node. Rather, the present invention can be applied to any network infrastructure across which it is desired to transport traffic flows having varying latency requirements. In some cases (i.e., the exemplary embodiments described herein), this network infrastructure will be limited to a switch fabric of a single node, across which the traffic flows are transported between input and output interfaces. However, the present invention may equally be deployed across multiple nodes and/or links of the network, and facilitate traffic streams between input and output interfaces that are respectively disposed in sending and receiving nodes of the network. As a further alternative, the present invention may be deployed within a communication subsystem of an Optical-Electrical-Optical (OEO) switch.

In order to facilitate understanding of the present invention, exemplary operations of a conventional network node will be briefly described with reference to FIG. 1. Principle operations of the present invention will then be described with reference to FIGS. 2-5.

Figure 1:
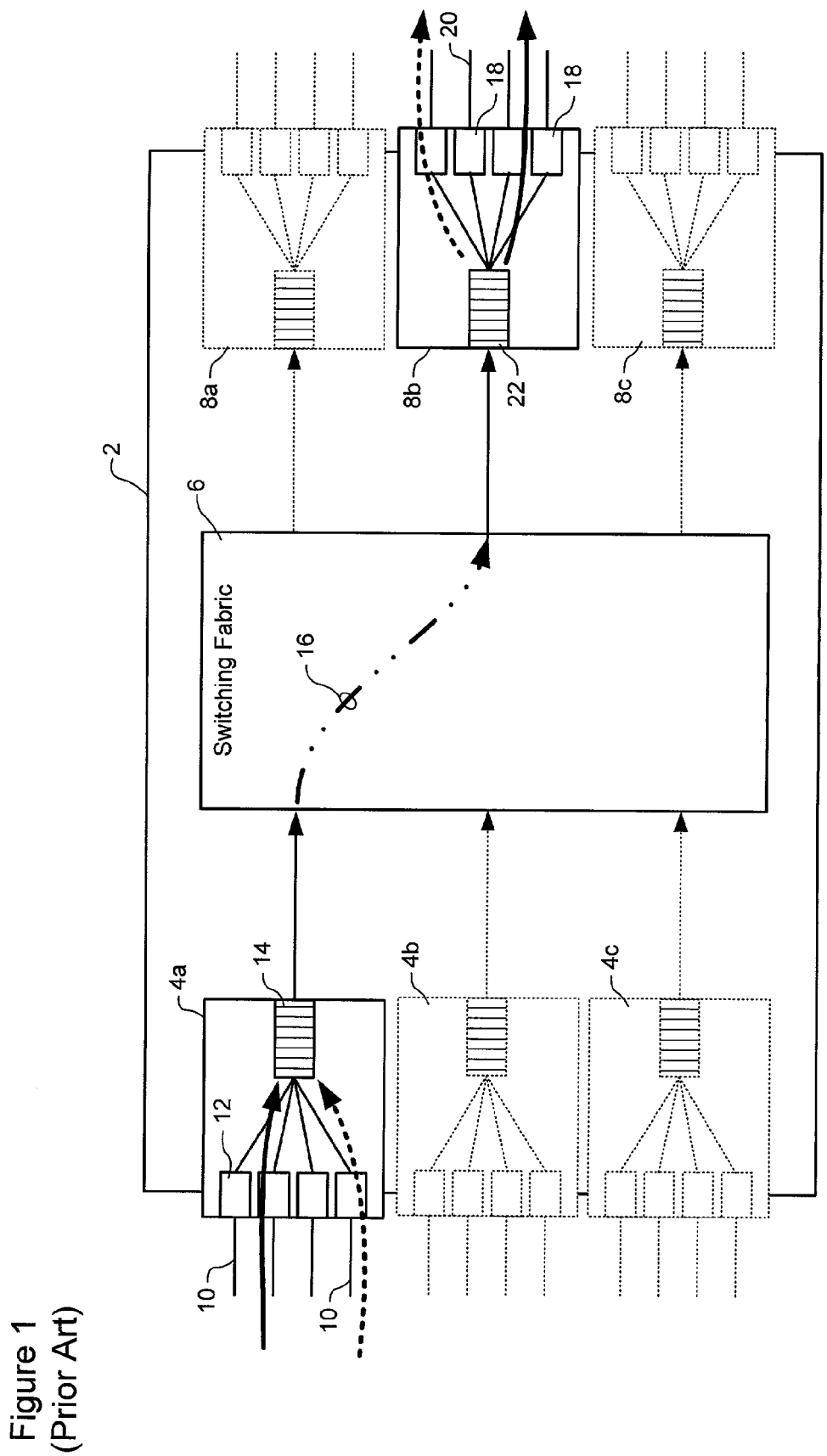
FIG. 1 is a block diagram schematically illustrating operation of a conventional network node.

FIG. 1 is a block diagram schematically illustrating operation of a conventional network node 2. The node 2 may be deployed as a router or switch within a broadband packet network (not shown), such as, for example, an Internet Protocol (IP) or an Asynchronous Transfer Mode (ATM) network. As shown in FIG. 1, the node 2 generally comprises a plurality of input interfaces 4a-4c; a switch fabric 6; and a plurality of output interfaces 8a-8c.

Each input interface 4, which may be provided as any suitable combination of hardware and software, operates to process traffic streams received through respective upstream channels 10 of the network. Typically, an input interface 4 will be provisioned as a physical network interface card (NIC) having a set of input ports 12, each of which is designed to receive inbound traffic through one or more respective upstream channels 10 of the network. This functionality may be implemented using a conventional physical port (which may include any of conventional signal demultiplexing, detection and conditioning circuits), and/or a logical port connection mapped from another point within the network using, for example, a sub-connection identifier such as an IEEE 802.3q VLAN tag. An input queue 14 is used to buffer data packets prior to transmission through the switch fabric 6. In operation, data packets received through each input port 12 are ingress processed and written to the input queue 14. At a minimum, this ingress processing includes selecting the output interface 8 to which packets of each involved traffic stream are to be conveyed, and prioritization to determine the order in which packets of competing traffic streams are to be loaded into the input queue 14. Additional ingress processing may include mapping received packets into an intra-switch frame (not shown), for example to facilitate routing through the switch fabric 6 and output processing in the respective output interface 8. Following ingress processing, packets of the each traffic stream are written to the input queue 14. Data of each packet can then be sequentially read from the input queue 14 and conveyed through the switch fabric 6.

The switch fabric 6 implements a conventional backplane interconnection switch topology. This may take the form of a multi-layer CLOS network, or any other known switching system. In either case, the fabric 6 operates to route data read from the input queue 14 of an input interface 4 to an appropriate output interface 8 without visibility of the content of the involved data packets. As shown in FIG. 1, this operation will normally result in all of the data traffic between a pair of input and output interfaces 4,8 following substantially the same intra-switch path 16 through the switch fabric 6. Typically, this traffic will traverse the same physical infrastructure (or bus, not shown) within the switch fabric 6, with packets of different traffic streams being separated into respective different channels (which may be provided as time slots).

As is well known in the art, resources of the switch fabric 6 are typically allocated to each intra-switch path 16 based primarily on the total traffic within the fabric 6, in order to facilitate load balancing and desired non-blocking performance. Resources are allocated without visibility of the data content and type, and thus independently of any latency requirements that may be specified for a traffic stream being conveyed through the switch fabric 6.

Each output interface 8, which may be provided as any suitable combination of hardware and software, operates to process outbound traffic streams received through the switch fabric 6. Typically, an output interface will be provisioned as a physical (NIC) having a set of output ports 18, each of which is designed to launch one or more outbound traffic streams into respective downstream channels 20 of the network. As with the input ports 12 of each input interface 4, the functionality of each output port 18 may be implemented using a conventional physical port (which may include any of conventional signal conversion and multiplexing circuits), and/or a logical port connection mapped to another point within the network using, for example, a sub-connection identifier such as an IEEE 802.3q VLAN tag. A virtual port 22 is used to receive data conveyed through the switch fabric 6. Thus the virtual port 22 serves to terminate one or more intra-switch paths 16 through the switch fabric 6, and receives data traffic of each involved path 16. In operation, data packets of each traffic stream received by the virtual port 22 are buffered to facilitate egress processing by the output interface 8. At a minimum, egress processing of the outbound traffic will include passing the traffic to the appropriate output network port 18. Additional egress processing may include striping an intra-switch frame header, if any. Following egress processing, packets of each traffic flow are launched into respective downstream data channels 20 of the network via appropriate output ports 18, as shown in FIG. 1.

In the system of FIG. 1, three input interfaces 4*a-c* are provided, each of which has four input ports 12, and a single input queue 14. However, it will be understood that there may be fewer or more than three input interfaces 4. Similarly, each input interface 4 may include fewer or more than four input ports 12. In addition, each input interface 4 may include more than one input queue 14, in order to reduce "bottlenecks" and increase the capacity of each input interface 4. For each input queue 14, involved traffic streams will be subject to substantially identical ingress processing (e.g., to implement the same prioritization scheme).

Similarly, in the system of FIG. 1, three output interfaces 8*a-c* are provided, each of which has a single virtual port 22 and four output ports 18. However, it will be understood that there may be fewer or more than three output interfaces 8. Each output interface 8 may include fewer or more than four output ports 18. In addition, each output interface 8 may include more than one virtual port 22, in order to reduce "bottlenecks" and increase the capacity of each output interface. For each virtual port 22, involved traffic streams will be subject to substantially identical egress processing.

As may be appreciated, the above described node operation can be equally applied to traffic flows within a broadband mesh network (such as an IP or ATM networks) or within a ring-type network, such as is commonly used to convey SONET traffic. However, as discussed above, the strict latency requirements of SONET traffic (or, more generally, any network management or critical mission traffic) places severe limitations on the amount of ingress and egress processing that can be performed. In practice these limitations effectively preclude the use of prioritization schemes to manage the writing of competing traffic streams into the input queue 14 of the input interface 4. Furthermore, the resources allocated to each intra-switch path 16 through the switch fabric 6 can be reduced as the total amount of traffic through the fabric 6 increases. In the case of low latency traffic types (such as SONET), this may produce undesirable variations in the speed with which data can be transported across the switch fabric 6.

Figure 2:
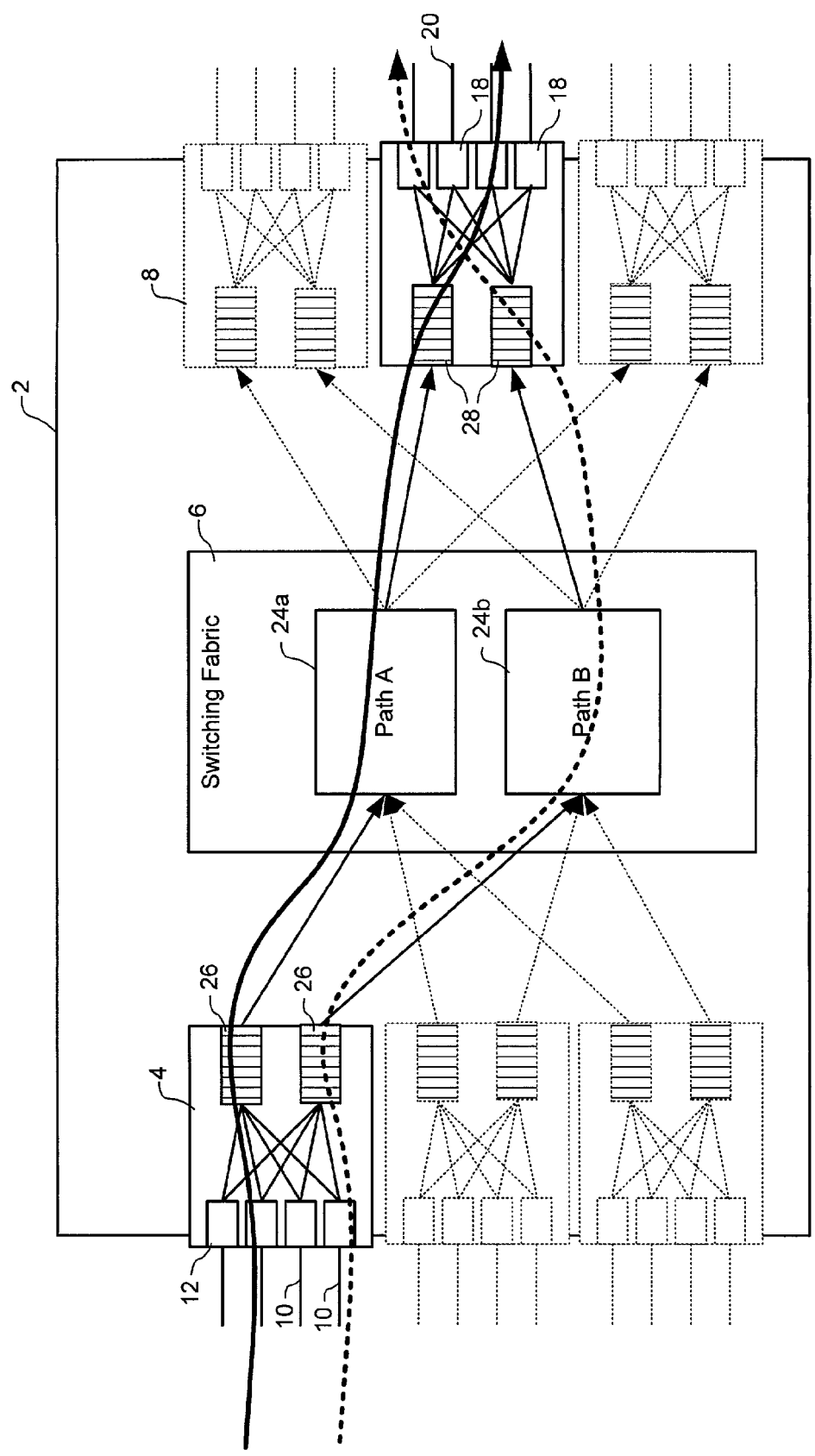
FIG. 2 is a block diagram schematically illustrating operation of a network node in accordance with an embodiment of the present invention.
Figure 3:
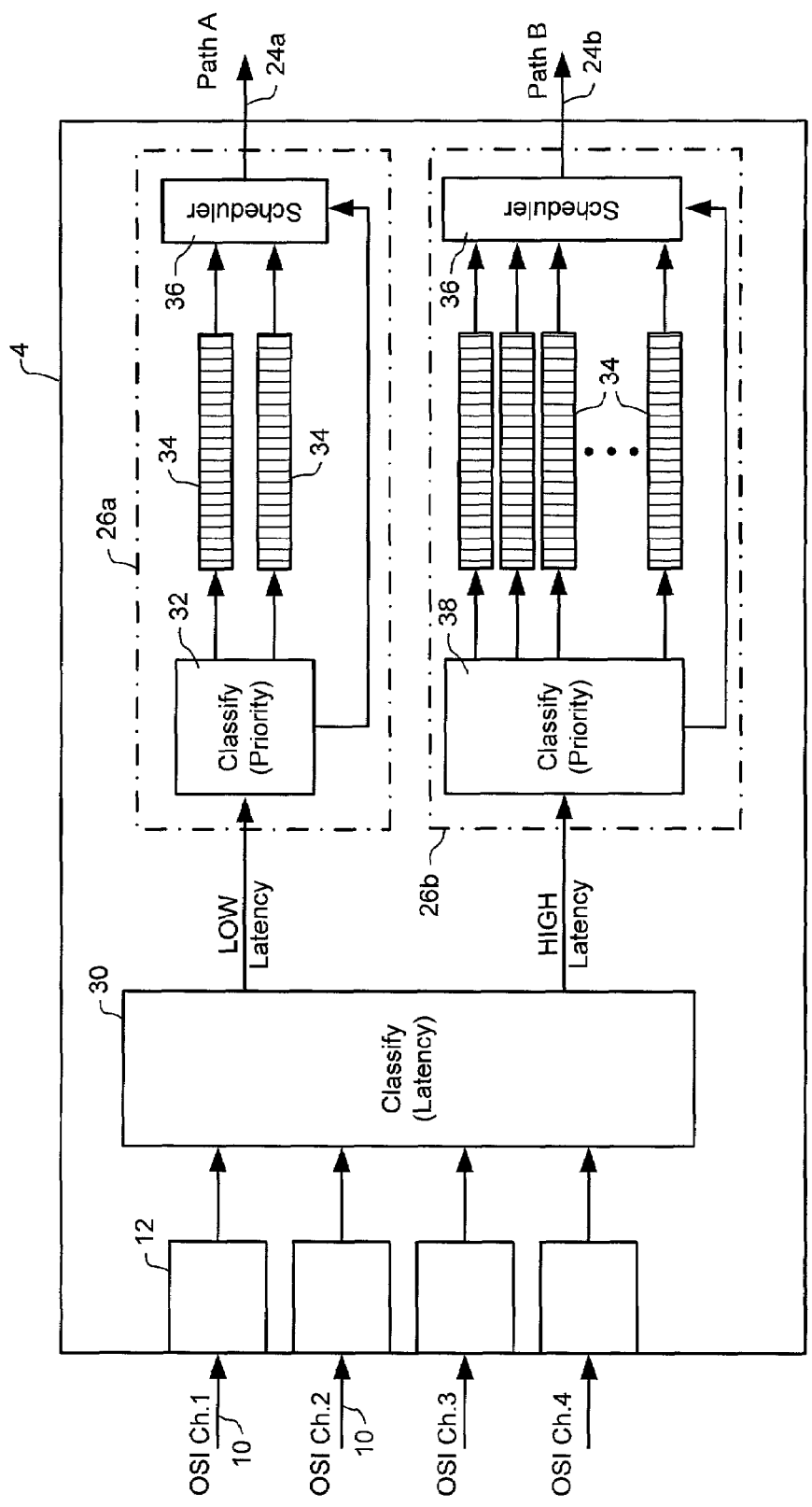
FIG. 3 is a block diagram schematically illustrating exemplary input processing in accordance with the embodiment of FIG. 2.
Figure 4:
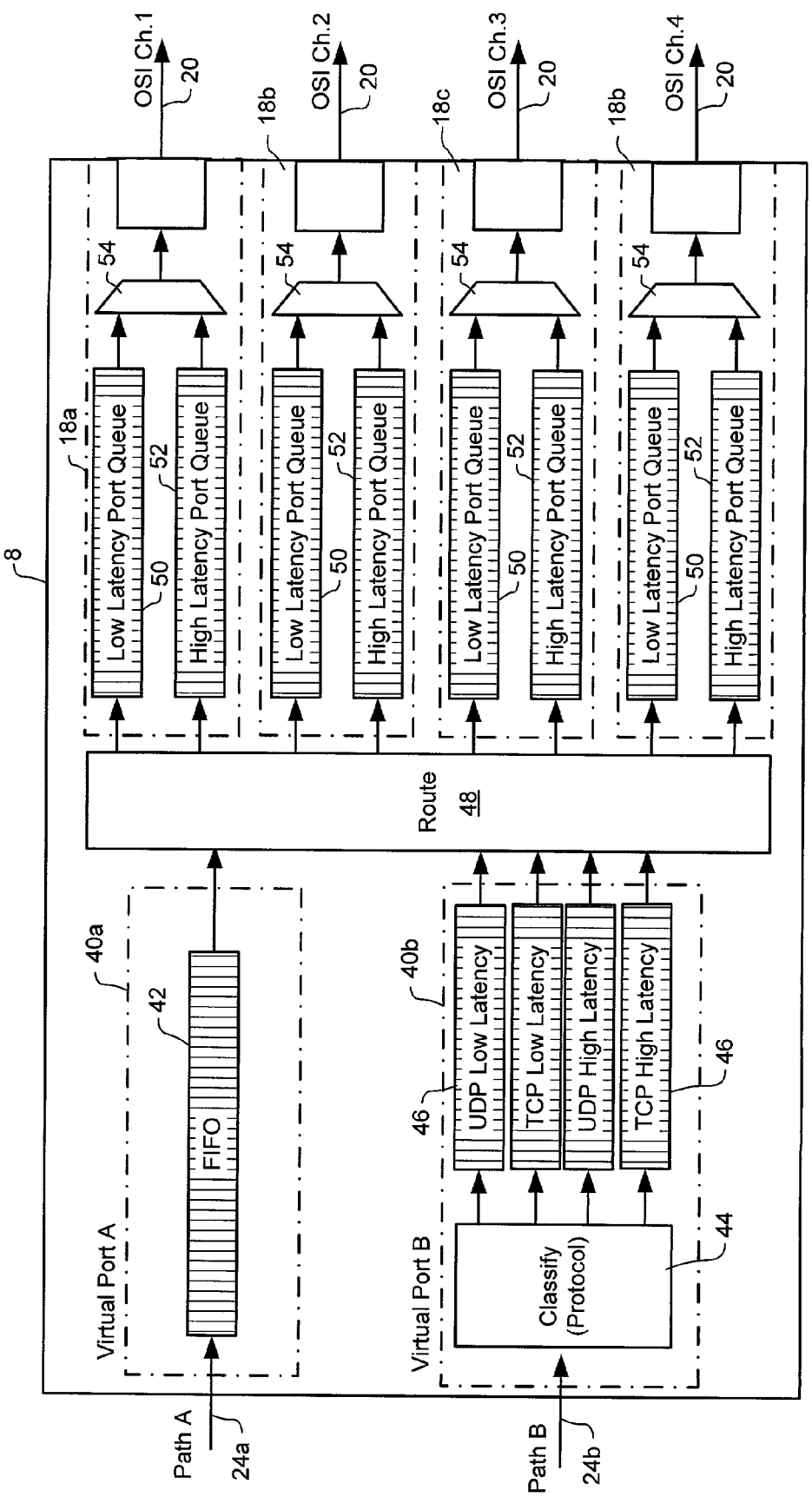
FIG. 4 is a block diagram schematically illustrating exemplary output processing in accordance with the embodiment of FIG. 2.

The present invention provides a method and system for avoiding the above limitations, so that an arbitrary mixture of low and high latency traffic streams can be concurrently routed through a common switch fabric. In general, the present invention implements a multi-dimensional traffic classification scheme, in which multiple orthogonal traffic classification methods are successively implemented for each traffic stream traversing the system. This arrangement enables traffic streams having similar latency requirements to traverse the system through a path optimized for those latency requirements, and independently of traffic streams having significantly different latency requirements. For example traffic with delay requirements of less than few 10's of micro-seconds can traverse the system in one path, while traffic with higher delay requirements traverse the system in another path. As a result, traffic streams having markedly different latency requirements can be efficiently transported across common switch fabric. FIGS. 2-4 illustrate an exemplary embodiment of the present invention deployed in a network node.

FIG. 2 is a block diagram schematically illustrating operation of an embodiment of the present invention deployed in a network node. In the embodiment of FIG. 2, three stages of traffic classification are implemented. In particular, at the ingress end of each path, inbound traffic received by the input interface is processed through a first classification stage for separating traffic streams based on their respective latency requirements. A second classification stage is then implemented (within each path) in which traffic streams having similar latency requirements are prioritized for transport through the switch fabric. A third classification stage is implemented at the egress of each path (i.e., in the output interface), to ensure fairness as will be described in greater detail below.

As shown in FIG. 2, a pair of diverse paths 24 are mapped through the switch fabric 6 between each input interface 4 and each output interface 8. The paths 24 are "diverse", in that traffic within each path is processed independently, so that different schemes can be used for each of the second and third classifications stages in each path. Thus each path 24 is served by a respective input queue 26 in each input interface 4, and is terminated by a respective virtual port 28 in each output interface 8. If desired, the diverse paths 24 may be mapped through the switch fabric 6 via a common physical infrastructure (e.g., data bus), provided that this infrastructure has sufficient bandwidth capacity to satisfy the latency requirements of the most demanding traffic stream. Otherwise, respective different physical infrastructure can be used to support each path. Path diversity within the switch fabric 6 also means that resources of the fabric 6 can be independently allocated to each path 24. As a result, resource allocations can be biased in favor of the path 24 having the most severe latency requirements.

With this arrangement, each path 24 can be optimized (e.g., during set-up) to satisfy the latency requirements of predetermined traffic types. Thus, for example, Path A 24*a* (see FIG. 2) can be optimized to transport SONET traffic, and Path B 24*b* optimized for IP (or, more generally, all non-SONET) traffic. In this case, the latency classification stage would primarily involve identification and routing of received SONET and IP traffic types to the appropriate path. With the traffic thus separated, the second (prioritization) classification stage can be independently implemented for each path 24, thereby enabling different prioritization schemes to be implemented in each path. Each of the three classification stages are described in greater detail below with reference to FIGS. 3 and 4.

FIG. 3 is a block diagram schematically illustrating principal traffic classification operations implemented in the input interface of FIG. 2. As shown in FIG. 3, a latency classifier 30 (which may be implemented using any suitable combination of hardware and/or software) separates received traffic streams based on their respective latency requirements, and routes each stream to the ingress of the appropriate path 24. Continuing the example above, Path A 24*a* has been optimized (e.g., during set-up) for SONET traffic, while Path B 24*b* has been optimized for IP traffic. In this case, the latency classifier 30 must identify SONET and IP traffic streams, and route each traffic stream to the appropriate path 24. As may be appreciated, various methods may be employed for this purpose. For example, SONET and IP traffic streams can be distinguished by examining each packet (or frame) header, and then using a look-up table to determine the appropriate path.

Alternatively, a connection-oriented traffic stream (such as, for example, SONET traffic) follows an end-to-end connection which is set up prior to the beginning of a communications session, and which remains "nailed-up" for at least the duration of the session. In such cases, both the upstream channel 10 through which the SONET traffic will be received, and the appropriate path 24, can be determined at the time of set-up of the SONET connection. Thus the latency classifier 30 can be designed to automatically route all inbound traffic to path B 24b as a "default", without checking headers or latency requirements. During set-up of a SONET connection, this default routing is changed for the involved up-stream channel 10, so that all traffic received through that up-stream channel 10 is automatically routed to Path A 24a, again without checking headers or latency requirements. As will be appreciated, the automatic classification and routing of received packets (or frames) significantly reduces delays incurred by the involved traffic streams.

Other methods may be used to implement the latency classifier, as desired. For example, the latency classifier 30 may be designed to extract critical mission and/or network management message content from each received data stream, and then route this extracted content through a selected path. Thus, for example, the contents of the K1 and K2 bytes of each received SONET frame can be extracted and routed to Path A 24a (e.g. within a "K-packet") for transport through the switch fabric 6.

Once traffic streams have been separated by the latency classifier 30, the second classification stage is implemented to prioritize the traffic in each path 24 for transport through the switch fabric 6. This "prioritization" stage is independently implemented in each path 24, and can be implemented with other ingress processing, if desired. As such, a different classification (or prioritization) scheme can be used in each path. Similarly, different ingress processing steps can be implemented in each path.

Thus, in the embodiment of FIG. 3, a prioritization classifier 32 operates to classify SONET traffic received from the latency classifier 30. By this means, the SONET traffic is separated into two sub-streams, each of which is loaded into a respective buffer 34 (which may be provided as a conventional First-In-First-Out—FIFO) of the input queue 26a. For example, SONET frames may be routed by the prioritization classifier 32 into one buffer 34, while K-packets containing critical mission and/or network management message content is routed to another buffer 34. A scheduler 36 controlled by the classifier 32 then controls the transmission of data from each buffer 34. This arrangement provides an efficient means of transporting SONET traffic through the input interface 4 with minimum delay, while at the same time ensuring that SONET K-Byte protection switching messages; Alarm Indication Signals (AIS); and Remote Defect Indication (RDI) signals are given priority over other SONET traffic.

If desired, other ingress processing of the SONET traffic can be accommodated. For example each SONET frame may be mapped into an IP packet in order to facilitate transport through the switch fabric 6 and/or egress processing in the output interface 8. As is well known in the art, this may be accomplished in various ways, such as, for example, simply attaching an IP header onto the front of each frame. Alternatively, the frame payload may be extracted and inserted into an IP packet. Of course, it will be appreciated that in cases where the switch fabric 6 is capable of transporting data (and the output interface 8 capable of egress processing each frame) independently of its format, this mapping step may be omitted entirely.

Continuing the example of FIG. 3, IP traffic (or, more generally, all non-SONET traffic) from the latency classifier 30 is routed to path B 24b and classified (at 38) according to a Quality of Service (QoS) marker in the packet header (not shown). This QoS marker may be contained in the Differentiated Services Code Point (DSCP) field of the frame header, or Tspec and Rspec parameters indicative of the desired QoS treatment. This arrangement enables the IP traffic to separated into virtually any desired number of sub-streams, based on the desired QoS treatment, and each sub-stream loaded into a respective buffer 34 (e.g., a FIFO) of the input queue 26b. A scheduler 36 controlled by the QoS classifier 38 then controls the transmission of data from each buffer 34. This arrangement provides an efficient means of transporting IP traffic through the input interface with minimum delay, while ensuring that high QoS traffic (such as, for example, VoIP and multimedia traffic) is granted priority over lower QoS traffic.

As is known in the art, broadband data traffic can frequently be classified as either "responsive" or "non-responsive". Responsive traffic (e.g., Transfer Control Protocol—TCP) is capable of detecting bandwidth congestion in a link (or path), and responds to any such congestion by reducing its demand for bandwidth. Conversely, non-responsive traffic (e.g., User Datagram Protocol—UDP) attempts to use any available bandwidth in a link (or path). As may be appreciated, if both responsive and non-responsive traffic streams are competing for bandwidth on a common path 24, then the responsive flows will progressively reduce their demand for bandwidth, as the non-responsive traffic consumes all of the bandwidth of the path 24. Ultimately, this can lead to bandwidth starvation, and consequent blocking, of responsive traffic through the path 24. Accordingly, a third classification stage is implemented as part of egress processing in the output interface 8, to ensure fairness and thereby avoid this problem. FIG. 4 is a block diagram schematically illustrating exemplary "fairness" classification operations implemented in the output interface 8 of FIG. 2.

As shown in FIG. 4, a respective virtual port 40 terminates each path 24, and can therefore implement respective different fairness classification schemes. Continuing the above example, virtual port A 40a receives only SONET traffic through path A 24a. In this case, fairness classification can be omitted, and received traffic buffered through a FIFO 42 to facilitate egress processing and routing to the appropriate output port 18. Exemplary egress processing may include stripping an IP header (if any) to recover the original frame format prior to launching the traffic into the appropriate downstream channel 20.

On the other hand, virtual port B 40b receives IP traffic (more generally, all non-SONET traffic), which may include a mixture of responsive and non-responsive traffic types. In this case, a "protocol" classifier 44 separates the received traffic based on the content of the "Type-ID" field in the packet header, and routes each traffic type to a respective buffer 46. This ensures that the bandwidth available to each traffic type is limited by its respective buffer 46, so that no one traffic type is capable of consuming all of the bandwidth capacity of the path 24.

As shown in FIG. 4, a router 48 is provided for coupling traffic from each virtual port 40 to the appropriate output port 18 for transmission. This can be accomplished by any suitable combination of hardware and/or software in a manner well known in the art.

In practice, each output port 18 normally serves two or more downstream channels 20 (although only one downstream channel per port is shown in FIG. 4), and thus may be required to transmit both high and low latency traffic streams. Accordingly, each output port 18 is provided with a respective set of low and high latency port queues 50 and 52, and a selector 54 for enabling data to be read from a selected one of the port queues 50,52 for transmission. In this case, the Router 48 is designed to couple traffic from each virtual port 40 to the appropriate port queue 50,52, based on latency requirements of the traffic being processed through each virtual port 40. Typically, these latency requirements will be known at a time of setup of a connection through the switch fabric, and thus the router 48 can be provisioned to automatically couple traffic from each virtual port 40 to the appropriate queue 50,52 of each output port 18, without examining each packet (or frame).

In the embodiment described above and illustrated in FIGS. 2-4, all of the traffic received by the input interface 4 is transported through two diverse paths 24. That is, SONET traffic is conveyed through path A 24a, while all other traffic traverses path B 24b. It will be appreciated that this provides a comparatively coarse division of traffic. However, more than two diverse paths may be used, if desired, to obtain a finer granularity of traffic separation. Furthermore, in the illustrated embodiment, path A 24a carries only SONET traffic. However, it will be appreciated that other traffic types (all having similarly stringent low latency requirements) may be conveyed through the same path as SONET traffic, with appropriate revisions in the prioritization and fairness classification stages implemented in path A 24a. Alternatively, a separate diverse path 24 can be set up for each low latency traffic type. Thus, for example, a path 24 could be set up and optimized for conveying ATM traffic, independently of SONET and IP traffic. Similarly, a path 24 could be set up and optimized for conveying critical mission and management messaging, independently of any other traffic. Alternatively, critical mission and management messaging can be conveyed through the same path 24 as its associated traffic streams (e.g. SONET alarm and protection switching messages can be conveyed through Path A 24a along with the other SONET traffic) and the scheduler 36 controlled to ensure that the critical mission and management messaging has priority over the other traffic within that path 24.

Figure 5:
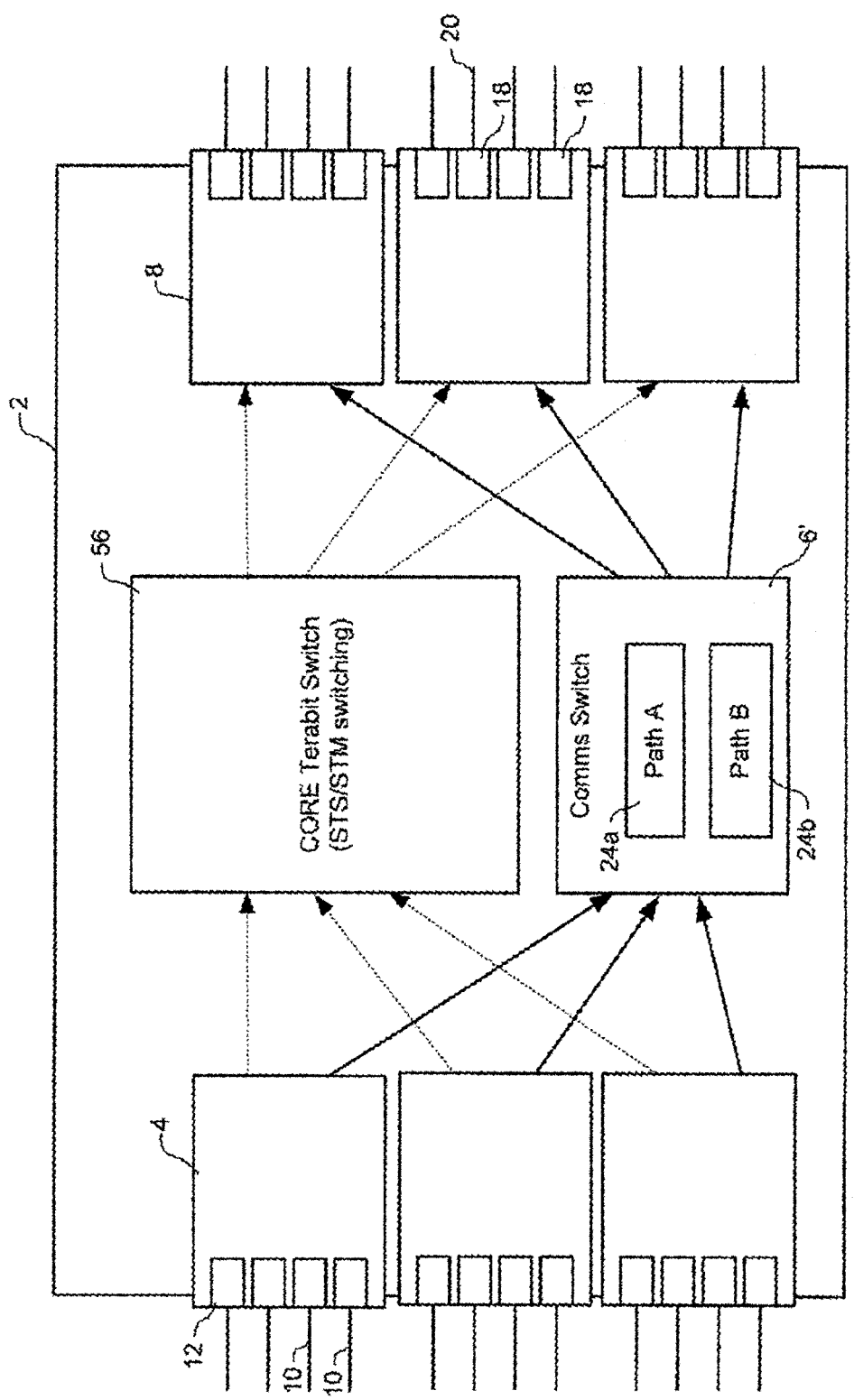
FIG. 5 is a block diagram schematically illustrating a network node which incorporates a communications subsystem in accordance with an embodiment of the present invention.

FIG. 5 is a block diagram schematically illustrating a network node 2 which incorporates a management communications (Comms) subsystem constructed in accordance with an embodiment of the present invention. In the embodiment of FIG. 5, a Comms switch 6' is used to convey both intra-switch (that is, pertaining to operations of the node itself) and inter-switch network management and critical mission messages. Examples of such intra- and inter-switch messages include (but are not limited to) protection switching messages; alarm messages of various types; as well as link and/or path set-up and release messages. Thus, the node 2 of FIG. 5 includes the Comms Switch 6', through which two or more diverse paths 24 are mapped between the input and output interfaces 4 and 6. With this arrangement, the ingress processing of inbound traffic received by each input interface 4, can be modified so that network management and critical mission message content is extracted from data traffic and routed to the Comms switch 6'. For example, the contents of the K-bytes of received SONET frames can be extracted from the received frames and inserted into a "k-byte packet" for transport through the Comms switch 6'. The k-byte packet can then be classified and routed through appropriate ones of the paths 24 in a manner directly analogous to that described above with reference to FIGS. 2-4.

Once the network management and critical mission message content has been extracted from the inbound traffic streams, the data traffic can then be routed through the node 2 via the CORE terabit switch 56, which may operate in a conventional manner, or, if desired, may also implement multi-stage traffic classification and diverse paths, as described above with reference to FIGS. 2-4.

The embodiment(s) of the invention described above is(are) intended to be exemplary only. The scope of the invention is therefore intended to be limited solely by the scope of the appended claims.

We claim:

1. A system for conveying an arbitrary mixture of high and low latency traffic streams across a common switch fabric, the system comprising:
    at least two diverse paths mapped though the switch fabric from a common input interface to a common output interface, each path being optimized to satisfy respective different traffic latency requirements;
    a latency classifier adapted to route each one of the traffic streams received at the input interface to one of the at least two diverse paths based upon a latency requirement of each traffic stream most closely matching the respective traffic latency of each of the at least two diverse paths;
    at least two prioritization classifiers, each one of the prioritization classifiers associated with one of the at least two diverse paths, each prioritization classifier independently prioritizes traffic being conveyed through the respective path, and
    wherein each one of the traffic streams received at the common input interface is routed to one of the at least two diverse paths by the latency classifier and each of the at least two diverse paths are processed independently by the respective prioritization classifiers before transport through the switch fabric to the common output interface.

2. A system as claimed in claim 1, wherein each path is mapped through respective different physical infrastructure of the switch fabric.

3. A system as claimed in claim 1, wherein two or more paths are mapped through a common physical infrastructure capable of supporting the path optimized to satisfy the most demanding latency requirements.

4. A system as claimed in claim 1, wherein the latency classifier is adapted to selectively couple each one of a plurality of upstream channels of the network to a selected one of the paths, such that a respective traffic stream of a communications session mapped through one of the upstream channels is automatically routed to the selected path.

5. A system as claimed in claim 4, wherein the selected path is determined at a time of set-up of the communications session.

6. A system as claimed in claim 4, wherein the latency classifier is further adapted to extract network management and critical mission message content from each traffic stream.

7. A system as claimed in claim 6, wherein the latency classifier is further adapted to route the extracted network management and critical mission message content to a different path from that of each traffic stream.

8. A system as claimed in claim 1, wherein each path comprises a respective input queue adapted to buffer data of each traffic stream being conveyed through the path.

9. A system as claimed in claim 1, wherein the input queue comprises:
at least two parallel buffers, each buffer being adapted to store data of at least one traffic stream being conveyed through the path; and
a scheduler for controlling transmission of data from each buffer through the path.

10. A system as claimed in claim 9, wherein the traffic streams being conveyed through the path comprise network management and critical mission messages, and the prioritization classifier is adapted to route the network management and critical mission messages to a selected one of the parallel buffers.

11. A system as claimed in claim 9, wherein the prioritization classifier is adapted to route each traffic stream to a selected one of the buffers based on a content of a predetermined field of the respective overhead of each traffic stream.

12. A system as claimed in claim 11, wherein the predetermined field comprises a respective K-byte field of each Synchronous Optical Network (SONET) traffic stream being conveyed through the path.

13. A system as claimed in claim 11, wherein the predetermined field comprises a respective Differentiated Services Code Point (DSCP) field of each Internet Protocol (IP) traffic stream being conveyed through the path.

14. A system as claimed in claim 1, further comprising a fairness classifier disposed at an egress of each path, each fairness classifier being adapted to separate responsive and non-responsive traffic streams received through the respective path.

15. A system as claimed in claim 14, wherein the fairness classifier is adapted to route each of the responsive and non-responsive traffic streams to a respective buffer.

16. A method of conveying an arbitrary mixture of high and low latency traffic streams across a common switch fabric, the method comprising a the steps of:
mapping at least two diverse paths through the switch fabric from a common input interface to a common output interface, each path being optimized to satisfy respective different traffic latency requirements;
routing each traffic stream received at the common input interface to a selected one of the at least two diverse paths, the selected path being optimized to satisfy latency requirements most closely matching a respective latency of the traffic stream; and
processing traffic in each of the at least two diverse paths by independently prioritizing the traffic to be conveyed through the switch fabric by each respective path to a common output interface.

17. A method as claimed in claim 16, further comprising a step of buffering each traffic stream being conveyed through the path within a respective input queue of the path.

18. A method as claimed in claim 16, further comprising a step of selectively coupling each one of a plurality of upstream channels to a selected one of the paths, such that a respective traffic stream of a communications session mapped through one of the upstream channels is automatically routed to the selected path.

19. A method as claimed in claim 18, wherein the selected path is determined at a time of set-up of the communications session.

20. A method as claimed in claim 18, further comprising steps of:
extracting network management and critical mission message content from each traffic stream; and
routing the extracted message content to a different path from that of each traffic stream.

21. A method as claimed in claim 16, wherein the step of controlling the priority of each traffic stream further comprises the steps of:
routing each traffic stream to a selected one of at least two parallel buffers, each buffer being adapted to store data of at least one traffic stream being conveyed through the path, the selected buffer being selected based on a content of a predetermined field of the respective overhead of each traffic stream; and
controlling transmission of data from each buffer through the path.

22. A method as claimed in claim 21, wherein the predetermined field comprises a respective K-byte field of each Synchronous Optical Network (SONET) traffic stream being conveyed through the path.

23. A method as claimed in claim 21, wherein the predetermined field comprises a respective Differentiated Services Code Point (DSCP) field of each Internet Protocol (IP) traffic stream being conveyed through the path.

24. A method as claimed in claim 16, further comprising a step of separating responsive and non-responsive traffic streams at a respective egress end of each path.

* * * * *